(12) United States Patent
Yamasaki et al.

(10) Patent No.: US 10,859,590 B2
(45) Date of Patent: Dec. 8, 2020

(54) AUTOMATIC ANALYZING APPARATUS

(71) Applicant: Canon Medical Systems Corporation, Otawara (JP)

(72) Inventors: Kenji Yamasaki, Otawara (JP); Takehiko Onuma, Oyama (JP); Makoto Ogasawara, Otawara (JP); Hiroko Takayama, Utsunomiya (JP); Reiko Maruyama, Nasushiobara (JP)

(73) Assignee: Canon Medical Systems Corporation, Otawara (JP)

( * ) Notice: Subject to any disclaimer, the term of this patent is extended or adjusted under 35 U.S.C. 154(b) by 231 days.

(21) Appl. No.: 15/917,998

(22) Filed: Mar. 12, 2018

(65) Prior Publication Data

US 2018/0267070 A1    Sep. 20, 2018

(30) Foreign Application Priority Data

Mar. 15, 2017  (JP) ................................ 2017-049988
Mar. 1, 2018   (JP) ................................ 2018-036504

(51) Int. Cl.
*G01N 35/10* (2006.01)
*B01L 3/00* (2006.01)
*B01L 7/04* (2010.01)
*G01N 35/00* (2006.01)

(52) U.S. Cl.
CPC ..... *G01N 35/1004* (2013.01); *G01N 35/1009* (2013.01); *B01L 3/52* (2013.01); *B01L 7/04* (2013.01); *B01L 2300/14* (2013.01); *B01L 2300/1883* (2013.01); *B01L 2400/06* (2013.01); *G01N 2035/00346* (2013.01); *G01N 2035/00801* (2013.01)

(58) Field of Classification Search
None
See application file for complete search history.

(56) References Cited

U.S. PATENT DOCUMENTS

| 2008/0213132 | A1  | 9/2008  | Watari et al. |
| 2013/0112761 | A1* | 5/2013  | Dunfee ............. G05D 23/1306 236/12.1 |
| 2015/0323220 | A1* | 11/2015 | Dumitrescu ............. F24H 1/12 222/1 |

FOREIGN PATENT DOCUMENTS

| JP | 2008-203009    | 9/2008 |           |
| JP | 2012-150023    | 8/2012 |           |
| JP | 2013-53935     | 3/2013 |           |
| JP | 5466183        | 4/2014 |           |
| WO | WO-2018110158 A1 * | 6/2018 | ............. G01N 35/00 |

* cited by examiner

*Primary Examiner* — Kathryn Wright
(74) *Attorney, Agent, or Firm* — Oblon, McClelland, Maier & Neustadt, L.L.P.

(57) ABSTRACT

According to one embodiment, an automatic analyzing apparatus includes a liquid tank, a first pump, a dispensing probe, and a thermal exchanger. The liquid tank stores a first liquid. The first pump pressurizes and sends the first liquid supplied from the liquid tank. The dispensing probe uses the first liquid that is sent out from the first pump as a pressure transmitting medium. The thermal exchanger exchanges heat between an atmosphere in the automatic analyzing apparatus and the first liquid in at least a part of a first flow path connecting the first pump to the liquid tank.

18 Claims, 7 Drawing Sheets

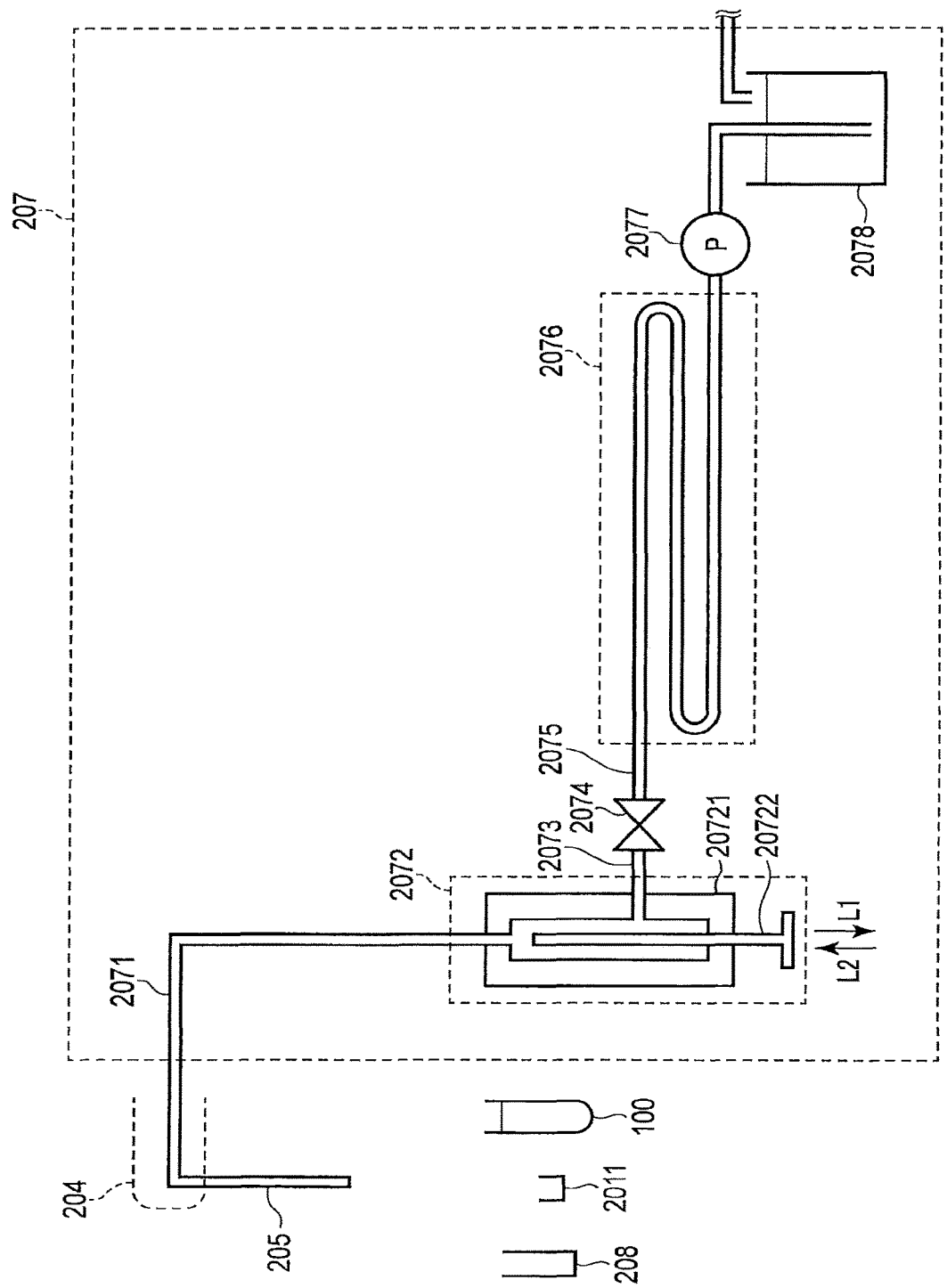
F I G. 4A

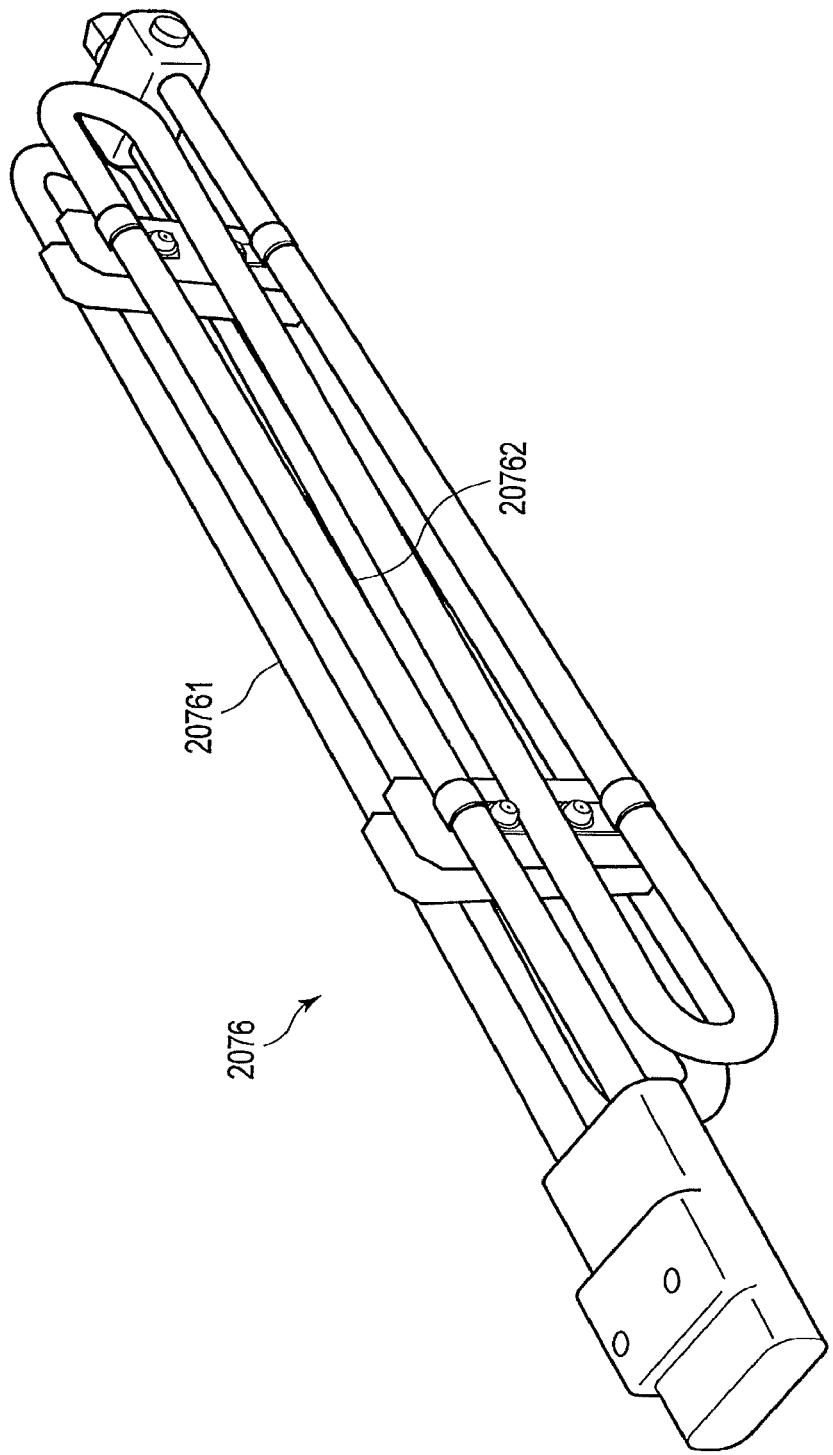

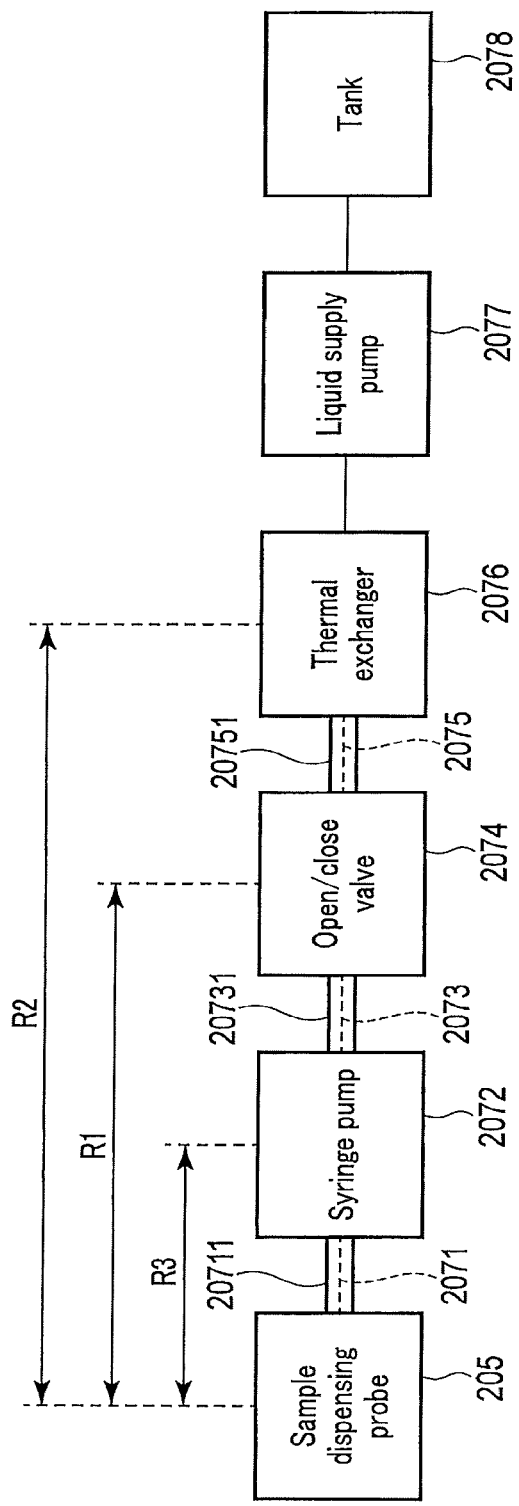
F I G. 5

AUTOMATIC ANALYZING APPARATUS

CROSS-REFERENCE TO RELATED APPLICATIONS

This application is based upon and claims the benefit of priority from the prior Japanese Patent Application No. 2017-049988, filed Mar. 15, 2017 and No. 2018-036504, filed Mar. 1, 2018, the entire contents of both which are incorporated herein by reference.

FIELD

Embodiments described herein relate generally to an automatic analyzing apparatus.

BACKGROUND

An automatic analyzing apparatus is an apparatus for measuring components included in test samples contained in sample vessels for test items, such as biochemical test items and immunity test items, etc. In the automatic analyzing apparatus, a test sample contained in a sample vessel is dispensed to a reaction tube by a sample dispensing probe. A reagent contained in a reagent depository is also dispensed to the reaction tube by a reagent dispensing probe. The test sample and the reagent are mixed in the reaction tube, and predetermined components in this solution mixture are optically measured. During this, amounts of the used test sample and reagent need to be precise to maintain accuracy of the measurement in the automatic analyzing apparatus.

In the automatic analyzing apparatus, there is a need for reducing an amount of an object test sample used per analysis, for example, an amount of blood taken from a patient to reduce stress on the patient. There is a need for reducing a cost of reagents and reducing environmental pollution caused by waste liquids and waste materials, by decreasing an amount of a reagent used per analysis. To satisfy these needs, in recent years an amount of a test sample or a reagent used in an automatic analyzing apparatus has been lessened.

Components, such as a probe constituting a mechanism for suctioning and discharging such a test sample and a reagent, and a tube, and a pressure transmitting medium used for suctioning and discharging a test sample and a reagent expand and shrink because of a temperature change; thus, an error may occur in an amount of a test sample or a reagent that is suctioned or discharged. A volume change in the pressure transmitting medium during suction and discharge operations affects liquid amount control. To correct such an error, a method of controlling a temperature of pure water, etc., which is a pressure transmitting medium used for cleaning inside of the probe, by providing a temperature sensor and a heater, etc. has been proposed.

In a conventional automatic analyzing apparatus, however, active temperature control, such as sensing and calculation, is necessary, making an apparatus configuration complicated, and errors by the temperature sensor and a lack of optimization of feedback control may cause a difference between an environmental temperature of an atmosphere in the apparatus and a temperature of pure water.

BRIEF DESCRIPTION OF THE DRAWINGS

FIG. 4A is a block diagram showing a configuration of a sample dispensing unit shown in FIG. 2.

FIG. 4B is a diagram showing a configuration of a thermal exchanger shown in FIG. 4A.

FIG. 5 is a diagram specifically explaining a range where the constituent elements of a sample dispensing probe and the sample dispensing unit 207 shown in FIG. 2 are configured as a heat insulating structure.

DETAILED DESCRIPTION

In general, according to one embodiment, an automatic analyzing apparatus includes a liquid tank, a first pump, a dispensing probe, and a thermal exchanger. The liquid tank stores a first liquid. The first pump pressurizes and sends the first liquid supplied from the liquid tank. The dispensing probe uses the first liquid that is sent out from the first pump as a pressure transmitting medium. The thermal exchanger exchanges heat between an atmosphere in the automatic analyzing apparatus and the first liquid in at least a part of a first flow path connecting the first pump to the liquid tank.

Embodiments will be described with reference to the drawings.

Figure 1:
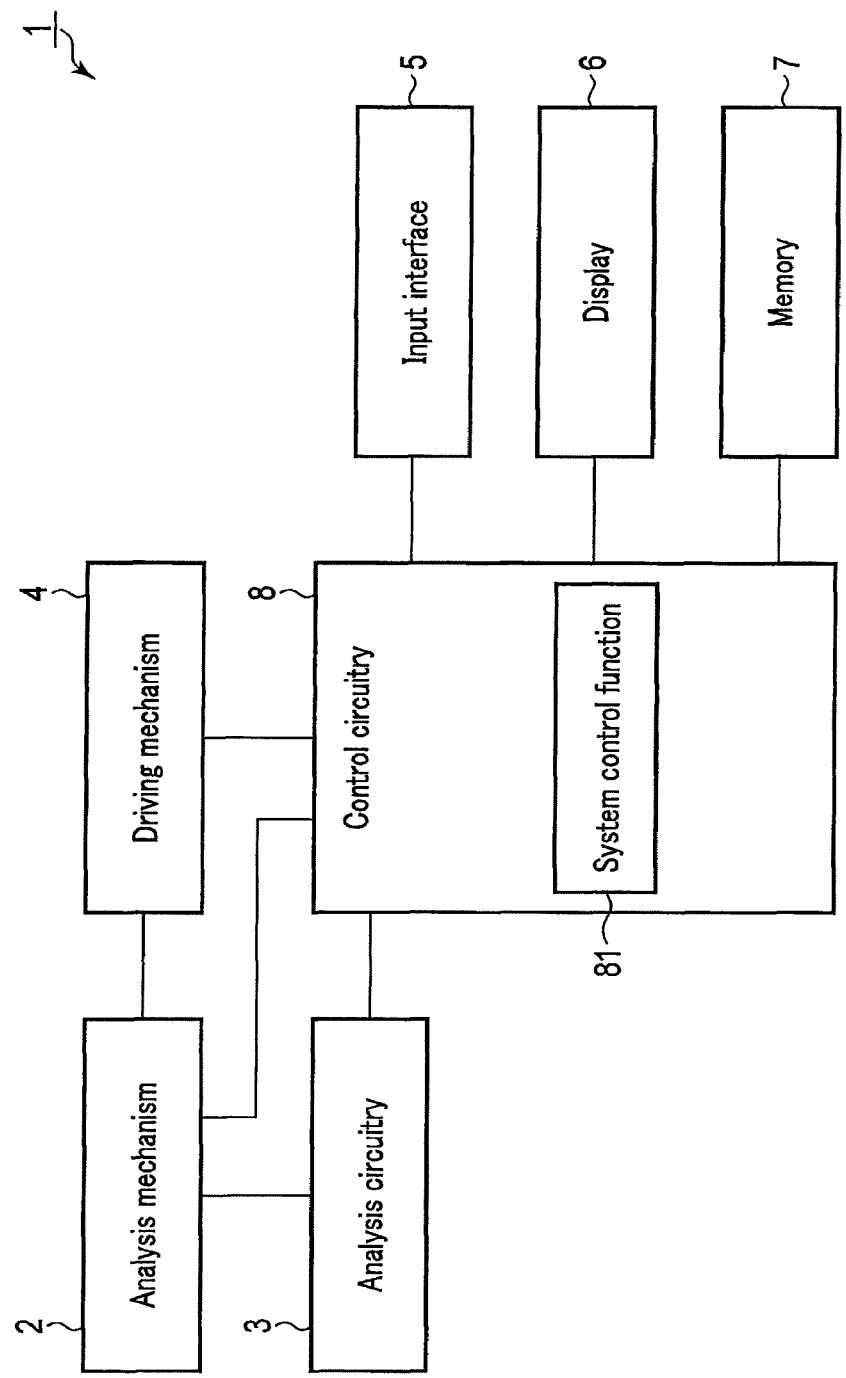
FIG. 1 is a block diagram showing a configuration of an automatic analyzing apparatus according to an embodiment.

FIG. 1 is a block diagram showing a configuration of an automatic analyzing apparatus 1 according to the present embodiment. The automatic analyzing apparatus 1 shown in FIG. 1 includes an analysis mechanism 2, analysis circuitry 3, a driving mechanism 4, an input interface 5, display 6, memory 7, and control circuitry 8.

The analysis mechanism 2 mixes a test sample, such as a standard test sample or an object test sample, with a reagent used for a test item that is set for this test sample. The analysis mechanism 2 measures the solution mixture of the test sample and the reagent, and generates standard data that is represented by, for example, an absorbency level, and object data.

The analysis circuitry 3 is a processor that analyzes calibration data and analysis data, etc. based on the standard data and the object data generated by the analysis mechanism 2. The analysis circuitry 3 reads an operating program from the memory 7, and generates calibration data and analysis data, etc. in accordance with the operating program. For example, the analysis circuitry 3 generates calibration data that indicates a relationship between the standard data and a standard value that is preset for a standard test sample. The analysis circuitry 3 generates analysis data that is represented by a concentration value and an enzyme activity value, based on the object data and calibration data of a test item corresponding to the object data. The analysis circuitry 3 outputs the generated calibration data and analysis data, etc. to the control circuitry 8.

The driving mechanism 4 is realized by a gear, a stepping motor, a belt conveyor, and a lead screw, and the like. The driving mechanism 4 drives the analysis mechanism 2 in accordance with the control of the control circuitry 8.

The input interface 5 is realized by, for example, a mouse, a keyboard, or a touch pad to which instructions are input by touch on its operation surface. The input interface 5 accepts, from an operator, a sample ID to identify a test sample that is a test target for which a test is carried out, a test item corresponding to the sample ID, and an analysis parameter of each test item. The input interface 5 is connected to the control circuitry 8, and an operation instruction that is input by the operator is converted into electric signals, and is output to the control circuitry 8. In each embodiment described in the specification, the input interface 5 is not limited to a member that includes physical operation components, such as a mouse and a keyboard, etc. Electric signal processing circuitry that receives an electric signal corresponding to an operation instruction that is input through an external input device independently provided from the automatic analyzing apparatus 1, and outputs the electric signal to the control circuitry 8 is an example of the input interface 5.

The display 6 includes, for example, a display device, such as a CRT (cathode-ray tube) display, a liquid crystal display, an organic EL (electroluminescence) display, or a plasma display, etc. The display 6 is connected to the control circuitry 8 and displays a signal supplied from the control circuitry 8 to the exterior. The display 6 displays calibration data and analysis data supplied from the control circuitry 8, for example.

The memory 7 includes a processor-readable storage medium, etc., such as a magnetic or optical storage medium, or a semiconductor memory, etc. The memory 7 stores an operating program that is executed by the analysis circuitry 3 and an operating program that is executed by the control circuitry 8. The memory 7 stores the calibration data generated by the analysis circuitry 3 for each test item. The memory 7 stores the analysis data generated by the analysis circuitry 3 for each object test sample.

The control circuitry 8 is a processor acting as a nerve center of the automatic analyzing apparatus 1. The control circuitry 8 executes the operating program stored in the memory 7 to realize a function corresponding to the operating program. The control circuitry 8 has, for example, a system control function 81 shown in FIG. 1.

The system control function 81 is a function of integrally controlling each element of the automatic analyzing apparatus 1 based on input information that is input from the input interface 5. When the system control function 81 is performed, the control circuitry 8 controls the operation of each element of the analysis mechanism 2 via the driving mechanism 4 based on the input information. The control circuitry 8 directly controls the operation of each element of the analysis mechanism 2 based on the input information.

Figure 2:
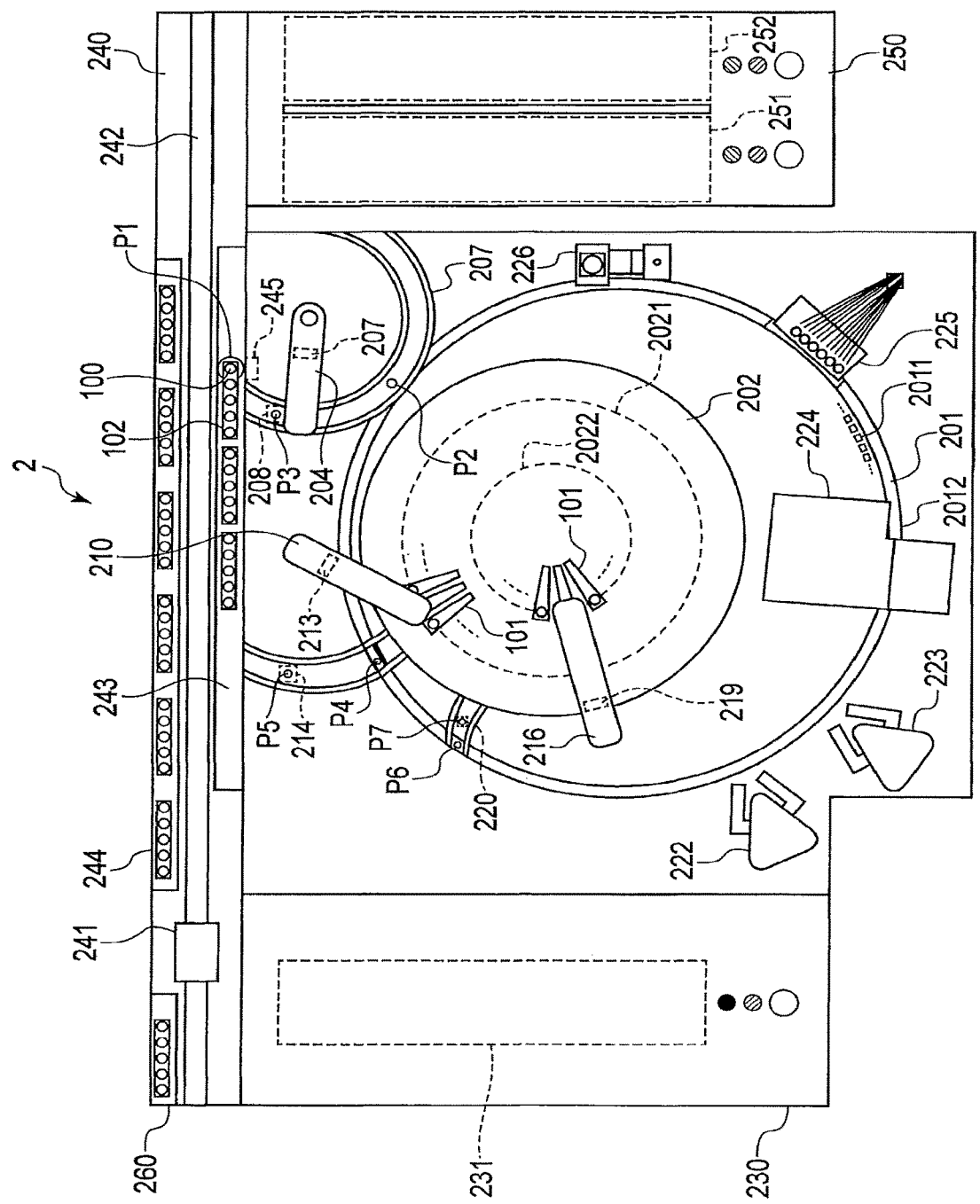
FIG. 2 is a diagram showing a configuration of an analysis mechanism shown in FIG. 1.
Figure 3:
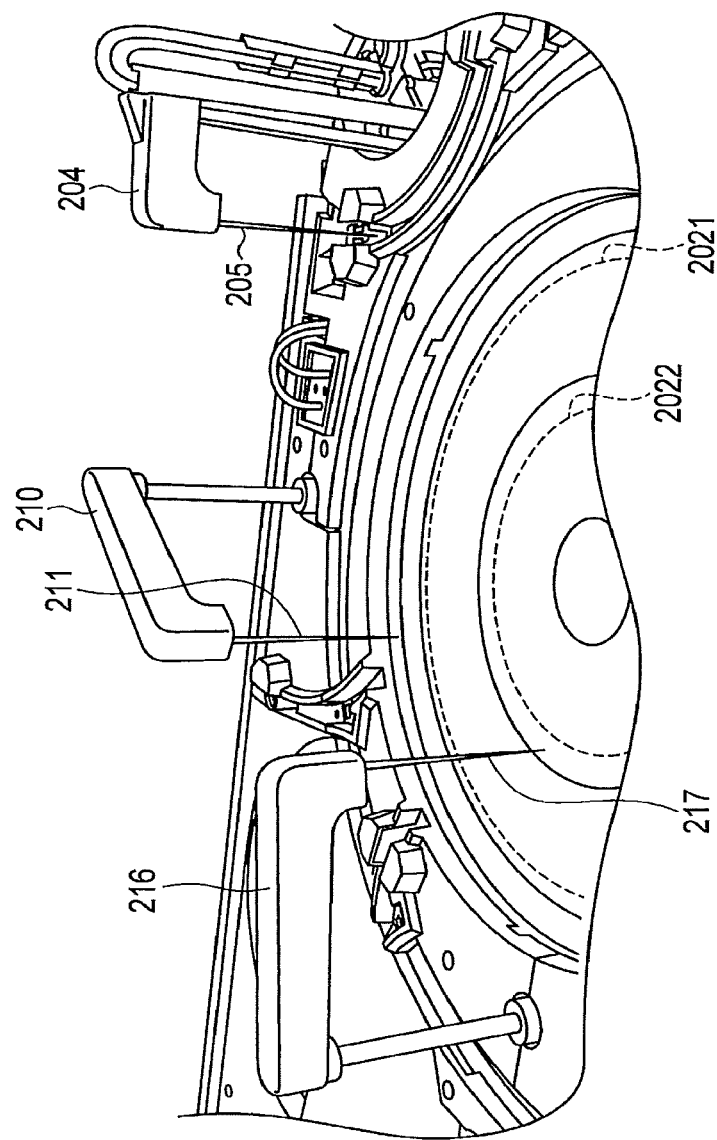
FIG. 3 is a diagram showing a configuration of the analysis mechanism shown in FIG. 1.

FIGS. 2 and 3 are schematic diagrams showing an example configuration of the analysis mechanism 2 shown in FIG. 1. The analysis mechanism 2 shown in FIGS. 2 and 3 includes a reaction disc 201 and a reagent depository 202.

A constant temperature bath 2012 filled with water at a constant temperature is provided in the reaction disc 201. The constant temperature bath 2012 has a circular shape. The reaction disc 201 stores a plurality of reaction tubes 2011 in the constant temperature bath 2012. Rotating and stopping the reaction disc 201 are alternately repeated by the driving mechanism 4 at a given time interval. The reaction tube 2011 is made of glass, for example.

The reagent depository 202 is an example of a reagent depository that stores a plurality of reagent vessels containing reagents, and in this embodiment, the reagent depository 202 is placed inside the reaction disc 201. The reagent depository 202 stores a plurality of reagent vessels on the circumference by the reagent vessel rack. The outer circle 2021 of the reagent depository 202 shown in FIGS. 2 and 3 shows the position of the openings of the reagent vessels arranged on the outer circumference among the reagent vessels circumferentially arranged in the reagent depository 202. The inner circle 2022 of the reagent depository 202 indicates the position of the openings of the reagent vessels arranged on the inner circumference among the reagent vessels circumferentially arranged in the reagent depository 202.

The reagent vessels stored in the reagent depository 202 contain reagents to be dispensed into the reaction tubes 2011. The reagent vessels 101 whose openings are arranged along the outer circle 2021 contain first reagents respectively corresponding to test items. Which first reagent to be used is determined for each test item. The reagent vessels 101 whose openings are arranged along the inner circle 2022 contain second reagents respectively corresponding to test items. Like the first reagents, which second reagent to be used is determined for each test item. The reagent vessel rack is rotated with respect to the center of the reagent depository 202 as a rotation center by the driving mechanism 4.

The analysis mechanism 2 shown in FIGS. 2 and 3 includes a rack drop unit 230, a rack moving unit 240, a rack collecting unit 250, and an STAT rack drop lane 260.

The rack drop unit 230 includes a drop lane 231. A sample rack 102 is dropped into the drop lane 231. The sample rack 102 has a plurality of sample vessels 100 containing test samples. In the sides of the sample rack 102, for example, a pair of grooves having a shape that can be picked up by the transfer arm 241 provided in the rack moving unit 240 is formed. An RFID (radio frequency identification) chip (a wireless tag) is attached to the sample rack 102 to identify the presence/absence of the sample rack 102.

Each sample vessel 100 contains a test sample, such as a standard test sample or an object test sample. A label, on which an optical mark indicating identification information, etc. of a sample contained in the sample vessel 100 is printed, is attached to each sample vessel 100. The optical mark is a mark by which information of the sample vessel 100 and identification information of a test sample are encoded; for example, a bar code, a one-dimensional bar code, and a two-dimensional bar code, etc.

The sample rack 102 is dropped into the drop lane 231. The sample rack 102 that is dropped into the drop lane 231 is driven by the driving mechanism 4, and moved to a drop position from which the sample rack 102 is movable to the rack moving unit 240. At this time, the moving of the sample rack 102 in the drop lane 231 is realized by, for example, a belt conveyor or a lead screw.

The rack moving unit 240 includes a transfer arm 241, a transfer rail 242, a sampling lane 243, a buffer lane 244, and a reader 245.

The transfer arm 241 has, for example, a pair of claws that is freely movable upward and downward. The transfer arm 241 transfers the sample rack 102 with the claws being inserted into the pair of grooves that is formed in the sample rack 102, like a forklift holding and carrying a package with its fork.

The transfer arm 241 is driven by the driving mechanism 4 and transfers the sample rack 102. For example, after holding the sample rack 102 placed at the drop position in the drop lane 231, the transfer arm 241 moves on the transfer rail 242. The transfer arm 241 thereby transfers the sample rack 102 to the sampling lane 243. The transfer rail 242 is provided between the sampling lane 243 and the buffer lane 244 to play a role of a guide when the transfer arm 241 moves. The transfer arm 241 moves on the transfer rail 242 after holding the sample rack 102 located in the sampling lane 243 at a transfer position, from which the rack 102 can move to the rack collecting unit 250. The transfer arm 241 thereby transfers the sample rack 102 to the buffer lane 244 or to the rack collecting unit 250.

The transfer arm 241 transfers the sample rack 102 placed in the buffer lane 244 to the rack collecting unit 250. The transfer arm 241 transfers the sample rack 102 placed in the buffer lane 244 to the STAT rack drop lane 260. The transfer arm 241 transfers the sample rack 102 containing an urgent test object which is placed in the STAT rack drop lane 260 to the buffer lane 244.

The sampling lane 243 is a lane for transferring a plurality of sample racks storing the sample vessels 100, which are a target for dispensing, to the sample suction position P1 where the sample dispensing probe 205 suctions a test sample. The sampling lane 243 moves the sample rack 102 that is transferred from the drop position in the drop lane 231 by the driving mechanism 4. For example, the sampling lane 243 moves the opening of each sample vessel 100 held by the sample rack 102 below the sample suction position P1. When dispensing of the test samples contained in all the sample vessels 100 held by the sample rack 102 is completed without any troubles, the sampling lane 243 moves the sample rack 102 from the position under the sample suction position P1 to a transfer position from which the rack 102 can be moved to the rack collecting unit 250. The moving of the sample rack 102 in the sampling lane 243 is realized by, for example, a belt conveyor or a lead screw.

The buffer lane 244 is an area for temporarily buffering the sample rack 102 that holds the sample vessels 100 containing test samples that causes certain errors.

The reader 245 is provided in the vicinity of the sample suction position P1, for example. The reader 245 starts reading when an instruction to start reading ID is input from the control circuitry 8. When the sample vessel 100, which is a target for dispensing, reaches a position where an optical mark is readable, the reader 245 reads identification information of the test sample from the optical mark attached to the sample vessel 100. The reader 245 supplies the read identification information of the test sample to the control circuitry 8. The reader 245 may be substituted by a sensor using RFID, etc.

The rack collecting unit 250 has a first collecting lane 251 and a second collecting lane 252. The first collecting lane 251 and the second collecting lane 252 serve as a destination where the sample rack 102, which holds the sample vessels 100 for which normal measurement is completed, is collected. The first collecting lane 251 and the second collecting lane 252 are driven by the driving mechanism 4, and move the sample rack 102 that has been transferred from the rack moving unit 240 by the transfer arm 241, to the retrieval position.

The STAT rack drop lane 260 is a lane for dropping the sample rack 102 that holds the sample vessels 100 containing test samples that need to be urgently measured.

The analysis mechanism 2 shown in FIGS. 2 and 3 includes a sample dispensing arm 204, a sample dispensing probe 205, a sample dispensing unit 207, a cleaning pool 208, a first reagent dispensing arm 210, a first reagent dispensing probe 211, a first reagent dispensing unit 213, a cleaning pool 214, a second reagent dispensing arm 216, a second reagent dispensing probe 217, a second reagent dispensing unit 219, a cleaning pool 220, a first stirring unit 222, and a second stirring unit 223.

The sample dispensing arm 204 is provided between the reaction disc 201 and the sampling lane 243 so as to move upwardly and downwardly with respect to the vertical direction and to move rotationally with respect to the horizontal direction. The sample dispensing arm 204 holds the sample dispensing probe 205 at one end. The sample dispensing arm 204 is rotated by the driving mechanism 4. Along with the rotation of the sample dispensing arm 204, the sample dispensing probe 205 rotates along an arc-shaped rotation track. On this rotation track, a sample suction position P1 is set where the sample dispensing probe 205 suctions a test sample from the sample vessel 100. The sample suction position P1 is set so as to be located in the sampling lane 243. At a position different from the sample suction position P1 on the rotation track, a sample discharge position P2 is set where the test sample suctioned by the sample dispensing probe 205 is discharged to the reaction tube 2011. The rotation track of the sample dispensing probe 205 crosses a track on which the sample vessel 100 held by the sample rack 102 placed in the sampling lane 243 moves, and a track on which the reaction tube 2011 held by the reaction disc 201 moves. These crossing points are the sample suction position P1 and the sample discharge position P2, respectively.

The sample dispensing probe 205 is driven by the driving mechanism 4 and moves upward and downward at the sample suction position P1 and the sample discharge position P2. The sample dispensing probe 205 suctions a test sample from the sample vessel 100 located at the sample suction position P1 in accordance with control of the control circuitry 8. The sample dispensing probe 205 discharges the suctioned test sample to the reaction tube 2011 located at the sample discharge position P2 in accordance with control of the control circuitry 8.

Next, the sample dispensing unit 207 according to the present embodiment will be explained. The sample dispensing unit 207 according to the present embodiment has a thermal exchanger 2076, which will be described later, in addition to the structures of a conventional automatic analyzing apparatus. FIG. 4A is a schematic diagram showing a configuration example of the sample dispensing unit 207. The sample dispensing unit 207 shown in FIG. 4A includes a first tube 2071, a syringe pump 2072, a second tube 2073, an open/close valve 2074, a third tube 2075, a thermal exchanger 2076, a liquid supply pump 2077, and a tank 2078. The syringe pump 2072 is an example of the first pump recited in the claims. The liquid supply pump 2077 is an example of the second pump recited in the claims.

The first tube 2071 is an elastic structure that is connected to the sample dispensing probe 205 at its one end. The syringe pump 2072 has a syringe 20721 and a plunger 20722. The syringe 20721 is connected to the other end different from the end to which the sample dispensing probe 205 of the first tube 2071 is connected. The plunger 20722 fits into an opening provided in the lower end portion of the syringe 20721. The tank 2078 stores a pressure transmitting medium that is filled in each of the sample dispensing probe 205, the first tube 2071, and the syringe pump 2072. The pressure transmitting medium is, for example, a liquid, such as pure water. The tank 2078 is connected to the exterior of the automatic analyzing apparatus 1, and the pressure transmitting medium stored in the tank 2078 is supplied from the exterior of the automatic analyzing apparatus 1. The liquid stored in the tank 2078 (e.g., pure water, etc.) is not only used as a pressure transmitting medium in the interior of the automatic analyzing apparatus 1, but also used as, for example, cleaning water for cleaning the inner wall of the sample dispensing probe 205; since a great amount of the liquid is thus consumed for various purposes, it is necessary to supply the liquid from the exterior in accordance with a used amount of the liquid. The pressure transmitting medium is not limited to pure water, but may be any liquid as long as it is non-elastic to a pressure and does not change properties of a dispense target (e.g., a test sample), for example.

The liquid supply pump 2077 suctions the pressure transmitting medium stored in the tank 2078, and supplies the suctioned pressure transmitting medium to the sample dispensing probe 205 via the thermal exchanger 2076, the third tube 2075, the open/close valve 2074, the second tube 2073, the syringe pump 2072, and the first tube 2071.

The open/close valve 2074 opens and closes a flow path that communicates the syringe pump 2072 with the liquid supply pump 2077. The supply of the pressure transmitting medium that flows from the tank 2078 to the syringe pump 2072 can be thereby controlled. The open/close valve 2074 is, for example, an electromagnetic valve.

The thermal exchanger 2076 is provided between the liquid supply pump 2077 and the open/close valve 2074. In at least a part of the flow path that connects the liquid supply pump 2077 to the open/close valve 2074, the thermal exchanger 2076 exchanges heat between the pressure transmitting medium that flows in the flow path and the atmosphere in the automatic analyzing apparatus 1. The inside of the apparatus means the inside of a housing in which the elements constituting the analysis mechanism 2 are stored, or the vicinity of such a housing, for example. More specifically, the inside means the inside of the sample dispensing probe 205 and the vicinity of the external thereof, and the inside of each of the elements constituting the sample dispensing unit 207 and the vicinity of the external thereof. The thermal exchanger 2076 is, for example, a stainless pipe (SUS pipe) that is optimized so as to have a sufficient length as the flow path for heat exchange.

By heat exchange in the thermal exchanger 2076, a temperature of the pressure transmitting medium that passes the thermal exchanger 2076 becomes closer to a temperature of the atmosphere in the apparatus, that is, an environmental temperature.

FIG. 4B is a diagram showing the configuration example of the thermal exchanger 2076 shown in FIG. 4A. According to FIG. 4B, the thermal exchanger 2076 has two S-shaped tubes 20761 and 20762 that have the same length and constitute the flow path. Each of the tube 20761 and the tube 20762 is connected to an input end that is connected to the liquid supply pump 2077 and to an output end that is connected to a third tube 2075 as appropriate, and it is thus easy to arrange these tubes. The S-shaped tubes allow the flow path to be sufficiently long, thereby expanding a surface area for heat exchange between the pressure transmitting medium and the atmosphere in the apparatus. Since the flow path is divided into the two tubes 20761 and 20762, the surface area for heat exchange between the pressure transmitting medium and the atmosphere in the apparatus can be expanded, compared to the case where one tube constitutes the flow path. For this reason, it is possible to bring the temperature of the pressure transmitting medium closer to the temperature of the atmosphere in the apparatus when the pressure transmitting medium passes through the thermal exchanger 2076.

When dispensing a test sample, the flow path between the syringe pump 2072 and the liquid supply pump 2077 is closed by the open/close valve 2074 which is controlled by the control circuitry 8. At this time, the syringe pump 2072 depressurizes or pressurizes the pressure transmitting medium supplied from the liquid supply pump 2077 to receive or send the pressure transmitting medium. Through this pressure transmitting medium, the sample dispensing probe 205 suctions or discharges a test sample in the sample vessel 100 at the sample suction position P2. More specifically, the driving mechanism 4 drives the plunger 20722 in the direction indicated by arrow L1 to suction, and the sample dispensing probe 205 suctions a test sample in the sample vessel 100 at the sample suction position P2. The driving mechanism 4 drives the plunger 20722 in the direction indicated by arrow L2 to discharge, and the sample dispensing probe 205 discharges a test sample into the reaction tube 2011 located at the sample discharge position P2.

When dispensing of the same test sample is finished, or when any malfunction occurs in the dispensing of the test sample, the flow path between the syringe pump 2072 and the liquid supply pump 2077 is opened by the open/close valve 2074 which is controlled by the control circuitry 8. The liquid supply pump 2077 is driven by the driving mechanism 4, and supplies the pressure transmitting medium to the inside of the sample dispensing probe 205.

The cleaning pool 208 is arranged at the sample probe cleaning position P3. In the cleaning pool 208, cleaning of the inner wall and the outer wall of the lower end portion of the sample dispensing probe 205 that is in contact with a test sample is carried out every time dispensing of the same test sample is finished, for example.

The first reagent dispensing arm 210 is provided between the reaction disc 201 and the sampling lane 243 so as to move upward and downward with respect to the vertical direction and to move rotationally with respect to the horizontal direction. The first reagent dispensing arm 210 holds the first reagent dispensing probe 211 at one end. The first reagent dispensing arm 210 is rotated by the driving mechanism 4. The first reagent dispensing probe 211 is rotated along the arc-shaped rotation track by rotating the first reagent dispensing arm 210. On this rotation track, a reagent suction position where the first reagent dispensing probe 211 suctions a first reagent corresponding to each test item from a reagent vessel arranged on the outer circle 2021 of the reagent depository 202, and a first reagent discharge position P4 where the first reagent dispensing probe 211 discharges the suctioned first reagent to the reaction tube 2011 are set. The rotation track of the first reagent dispensing probe 211 crosses a track on which (a reagent suctioning port of) a reagent vessel arranged on the outer circle 2021 of the reagent depository 202 moves, and a track on which the reaction tube 2011 held by the reaction disc 201 moves. These crossing points are the reagent suction position P1 and the first reagent discharge position P4, respectively.

The first reagent dispensing probe 211 is driven by the driving mechanism 4, and moves upward and downward at the reagent suction position and the first reagent discharge position P4 on the rotation track. The first reagent dispensing probe 211 suctions a first reagent from the reagent vessel 101 located at the reagent suction position on the rotation track in accordance with the control of the control circuitry 8. The first reagent dispensing probe 211 discharges the suctioned first reagent to the reaction tube 2011 located at the first reagent discharge position P4 in accordance with control of the control circuitry 8.

The structure and function of the first reagent dispensing unit 213 is the same as those of the sample dispensing unit 207.

The cleaning pool 214 is arranged at the first reagent probe cleaning position P5. In the cleaning pool 214, cleaning of the inner wall of the lower end portion of the first reagent dispensing probe 211 that is in contact with a reagent is carried out every time dispensing of the same test sample is finished, for example.

The second reagent dispensing arm 216 is provided between the reagent depository 202 and the rack drop unit 230 so as to move upward and downward with respect to the vertical direction, and to move rotationally with respect to the horizontal direction. The second reagent dispensing arm 216 has the second reagent dispensing probe 217 at one end. The second reagent dispensing arm 216 is rotated by the driving mechanism 4. The second reagent dispensing probe 217 is rotated along the arc-shaped rotation track by rotating the second reagent dispensing arm 216. On this rotation track, a reagent suction position where the second reagent dispensing probe 217 suctions a second reagent corresponding to each test item from a reagent vessel 101 arranged on the inner circle 2022 of the reagent depository 202, and a second reagent discharge position P6 where the second reagent dispensing probe 217 discharges the suctioned second reagent to the reaction tube 2011 are set. The rotation track of the second reagent dispensing probe 217 crosses a track on which (a reagent suctioning port of) a reagent vessel arranged on the inner circle 2022 of the reagent depository 202 moves, and a track on which the reaction tube 2011 held by the reaction disc 201 moves. These crossing points are the reagent suction position and the second reagent discharge position P6, respectively.

The second reagent dispensing probe 217 is driven by the driving mechanism 4, and moves upward and downward at the reagent suction position and the second reagent discharge position P6 on the rotation track. The second reagent dispensing probe 217 suctions a second reagent from the reagent vessel 101 located at the reagent suction position on the rotation track in accordance with the control of the control circuitry 8. The second reagent dispensing probe 217 discharges the suctioned second reagent to the reaction tube 2011 located at the second reagent discharge position P6 in accordance with control of the control circuitry 8.

The structure and function of the second reagent dispensing unit 219 is the same as those of the sample dispensing unit 207.

The cleaning pool 220 is arranged at the second reagent probe cleaning position P7. In the cleaning pool 220, cleaning of the inner wall and the outer wall of the lower end portion of the second reagent dispensing probe 217 that is in contact with a reagent is carried out every time dispensing of the same test sample is finished, for example.

Each of the first stirring unit 222 and the second stirring unit 223 has a stirring arm and a stirrer. The stirring arm rotationally supports the stirrer in the vicinity of the distal end of the arm, and is movable upward and downward. The first stirring unit 222 moves the stirrer to the reaction tube 2011 located at the stirring position in the reaction disc 201 under the control of the control circuitry 8, and stirs a solution mixture of the test sample and the first reagent, that is, the solution mixture in the reaction tube 2011 after dispensing of the first reagent, in the reaction tube 2011 by the stirrer. The second stirring unit 223 moves the stirrer to the reaction tube 2011 located at the stirring position in the reaction disc 201 under the control of the control circuitry 8, and stirs a solution mixture of the test sample, the first reagent, and the second reagent, that is, the solution mixture of the reaction tube 2011 after the second reagent is dispensed in the reaction tube 2011, by the stirrer in the reaction tube 2011.

The analysis mechanism 2 shown in FIGS. 2 and 3 includes a photometer unit 224, a cleaning unit 225, and an electrolyte measuring unit 226.

The photometer unit 224 irradiates light on, for example, a solution mixture of the test sample and the reagent that are discharged in the reaction tube 2011 to optically measure the light that passes the solution mixture. The photometer unit 224 has a light source and a light detector. The photometer unit 224 irradiates light on the reaction tube 2011 from the light source under the control of the control circuitry 8. The light detector detects light that passes a solution mixture of a standard test sample and a reagent in the reaction tube 2011, or a solution mixture of an object test sample and a reagent. The light detector generates standard data or object data that is represented by absorbency, for example, based on an intensity of detected light. The photometer unit 224 outputs the generated standard data or object data to the analysis circuitry 3.

The cleaning unit 225 has a waste liquid nozzle, a cleaning nozzle, and a drying nozzle. The cleaning unit 225 suctions the solution mixture in the reaction tube 2011 located in the reaction tube cleaning position as a waste liquid by the waste liquid nozzle. The cleaning unit 225 discharges the cleaning liquid through the cleaning nozzle to the reaction tube 2011 located at the reaction tube cleaning position to clean the reaction tube 2011. The cleaning unit 225 supplies dry air to the reaction tube 2011 through the drying nozzle to dry the reaction tube 2011 that has been cleaned by the cleaning liquid.

The electrolyte measuring unit 226 performs measurement of a specific electrolyte that is present in the solution mixture in the reaction tube 2011. The electrolyte measuring unit 226 measures a concentration of ions generated from a specific electrolyte, for example.

In the analysis mechanism 2 shown in FIG. 1, it is preferable to cover, for example, at least a part of the flow path where the pressure transmitting medium flows, from one end connected to the third tube 2075 of the thermal exchanger 2076 to the distal end of the sample dispensing probe 205 by a heat insulator. Thus, the pressure transmitting medium of which temperature becomes close to the temperature of the atmosphere as a result of the heat exchange by the thermal exchanger 2076 can reach the vicinity of the distal end of the sample dispensing probe 205, without undergoing a temperature change. FIG. 5 is a diagram specifically explaining ranges where the constituent elements of the sample dispensing probe 205 and the sample dispensing unit 207 shown in FIG. 2 are configured as a heat insulating structure.

In FIG. 5, the region in the vicinity of the range R1, which is from the distal end of the sample dispensing probe 205 to the open/close valve 2074, has a particularly strong influence on accuracy in dispensing due to its temperature change. For this reason, in the present embodiment, at least a part of the range R1 is covered by a heat insulator. For example, the first tube 2071 and the second tube 2073 are respectively covered by the heat insulator 20711 and the heat insulator 20731. At this time, it is desirable that a distance between the open/close valve 2074 and the thermal exchanger 2076, that is, a length of the third tube 2075, is as short as possible.

For example, if a temperature difference between the pressure transmitting medium and the atmosphere occurs in the interior and exterior of the third tube 2075 while the pressure transmitting medium is flowing in the third tube 2075 because of a significant length of the third tube 2075, at least a part of the flow path in the range R2 from the distal end of the sample dispensing probe 205 to one end which is connected to the third tube 2075 of the thermal exchanger 2076 may be covered by a heat insulator. For example, the first tube 2071, the second tube 2073, and the third tube 2075 are covered by the heat insulator 20711, the heat insulator 20731, and the heat insulator 20751, respectively.

To reduce consumption of insulators, at least a part of the flow path in the range R3 from the distal end of the sample dispensing probe 205 to one end connected to the first tube 2071 of the syringe pump 2072 may be covered by a heat insulator. For example the first tube 2071 is covered by the heat insulator 20711.

Next, characteristics and an arrangement of the thermal exchanger 2076 of the automatic analyzing apparatus 1 according to the present embodiment will be described.

First, characteristics of the thermal exchanger 2076 will be explained. The thermal exchanger 2076 shown in FIG. 4A has a function of raising a temperature of a pressure transmitting medium that flows in the thermal exchanger 2076 if the temperature of the pressure transmitting medium (a liquid) supplied from the liquid supply pump 2077 is lower than the temperature of the atmosphere in the apparatus. The thermal exchanger 2076 has a function of lowering a temperature of a pressure transmitting medium that flows in the thermal exchanger 2076 if the temperature of the pressure transmitting medium supplied from the liquid supply pump 2077 is higher than the temperature of the atmosphere in the apparatus. The thermal exchanger 2076 performs heat exchange by thermal conductivity between materials, without control by a dedicated temperature adjusting mechanism.

Next, an arrangement of the thermal exchanger 2076 will be explained. Generally, the range from the distal end of the sample dispensing probe 205 to the open/close valve 2074 has a strong influence on accuracy in dispensing, if the pressure transmitting medium that is filled in the range has a steep temperature gradient (rate of temperature change). For this reason, it is desirable that the temperature gradient of the range from the distal end of the sample dispensing probe 205 to the open/close valve 2074 is not steep, in other words, is gentle. Accordingly, the thermal exchanger 2076 is arranged at any point in the flow path up to the point where the pressure transmitting medium supplied from the tank 2078 reaches the open/close valve 2074. It is thereby possible to bring the temperature of the pressure transmitting medium close to the temperature of the atmosphere in the apparatus before the pressure transmitting medium supplied from the tank 2078 reaches the open/close valve 2074. As a result, it is possible to make the temperature gradient gentle in the range from the sample dispensing probe 205 to the open/close valve 2074, where at least a part thereof is covered by a heat insulator.

The liquid supply pump 2077 provided between the tank 2078 and the open/close valve 2074 has a relatively large amount of heat, as an availability rate of the pump is high. In the open/close valve 2074 on the other hand, heat generation is acceptable as an availability rate is relatively low. For this reason, it is preferable to arrange the thermal exchanger 2076 in the flow path between, for example, the open/close valve 2074 and the liquid supply pump 2077.

Herein, to give a direct action of temperature equalization through the heat exchange to a region having a strong influence on accuracy in dispensing due to its temperature change, for example a region in the vicinity of the flow path in the region R1 shown in FIG. 5, it is necessary to arrange the thermal exchanger 2076 as close to such a region as possible. For this reason, it is preferable to arrange the thermal exchanger 2076 in the vicinity of the open/close valve 2074 in the flow path connecting the open/close valve 2074 to the liquid supply pump 2077, for example.

The temperature change in the pressure transmitting medium from the time when the medium is supplied from the cleaning pool 208 until the medium reaches the sample dispensing probe 205 at the time of, for example, cleaning the inner wall of the sample dispensing probe 205 in the automatic analyzing apparatus 1 configured as described above, will be described with reference to FIG. 4A. In the following explanation, suppose the temperature of the pressure transmitting medium filled in the tank 2078 from the exterior of the automatic analyzing apparatus 1 is lower than the temperature of the atmosphere in the apparatus of the automatic analyzing apparatus 1. For example, the temperature of the pressure transmitting medium filled in the tank 2078 from the exterior of the automatic analyzing apparatus 1 is about 10 degrees lower than the temperature of the atmosphere in the automatic analyzing apparatus 1. This is because the atmosphere in the automatic analyzing apparatus 1 is higher than the exterior of the apparatus due to the heat source in the apparatus, and when a liquid is supplied to the tank 2078 from the exterior of the apparatus, the temperature of the liquid in the tank 2078 is relatively lowered. Particularly, if a liquid, such as pure water which is largely consumed, is used as the pressure transmitting medium, the liquid is always supplied to the tank 2078 from the exterior of the apparatus; as a result, the temperature of the liquid in the tank 2078 frequently becomes lower than the temperature of the atmosphere in the apparatus.

In FIG. 4A, the liquid supply pump 2077 suctions the pressure transmitting medium stored in the tank 2078, and supplies the suctioned pressure transmitting medium to the thermal exchanger 2076. The pressure transmitting medium that is supplied to the thermal exchanger 2076 exchanges heat with the atmosphere of the apparatus while passing the thermal exchanger 2076. The temperature of the pressure transmitting medium thereby rises, and becomes closer to the temperature of the atmosphere in the apparatus.

The pressure transmitting medium having the temperature close to the temperature of the atmosphere in the apparatus as a result of passing through the thermal exchanger 2076 reaches the distal end of the sample dispensing probe 205 via the third tube 2075, the open/close valve 2074, the second tube 2073, the syringe pump 2072, and the first tube 2071. At this time, at least a part of the range from the distal end of the sample dispensing probe 205 to the open/close valve 2074 is covered by a heat insulator. Thus, the pressure transmitting medium can pass the range R1 of the flow path at the temperature approximately the same as the temperature of the atmosphere in the apparatus, without a temperature change. In other words, when cleaning the inner wall of the sample dispensing probe 205, and when dispensing a test sample using the sample dispensing probe 205, for example, it is possible to maintain a uniform temperature in the interior and exterior of the flow path in which the pressure transmitting medium flows within the range from the distal end of the sample dispensing probe 205 to the open/close valve 2074.

As a result, in the range of the flow path from the distal end of the sample dispensing probe 205 to the open/close valve 2074, volume expansion or contraction of the pressure transmitting medium flowing in the members constituting the flow path or in the flow path does not occur. Accordingly, even when a test sample is dispensed immediately after cleaning, no error occurs in an amount of the dispensed test sample, thereby preventing losing accuracy in dispensing.

By using the thermal exchanger 2076, it is possible to bring the temperature of the pressure transmitting medium close to the temperature of the atmosphere in the apparatus, even if the temperature of the pressure transmitting medium filled in the tank 2078 from the exterior of the automatic analyzing apparatus 1 is higher than the temperature in the apparatus. For example, there is a case where a liquid flow path located outside of the apparatus or a liquid reservoir facility is under an influence of solar heat or other external heat sources; in such a case, the temperature of the pressure transmitting medium filled in the tank 2078 may be higher than the temperature in the apparatus.

Figure 6:
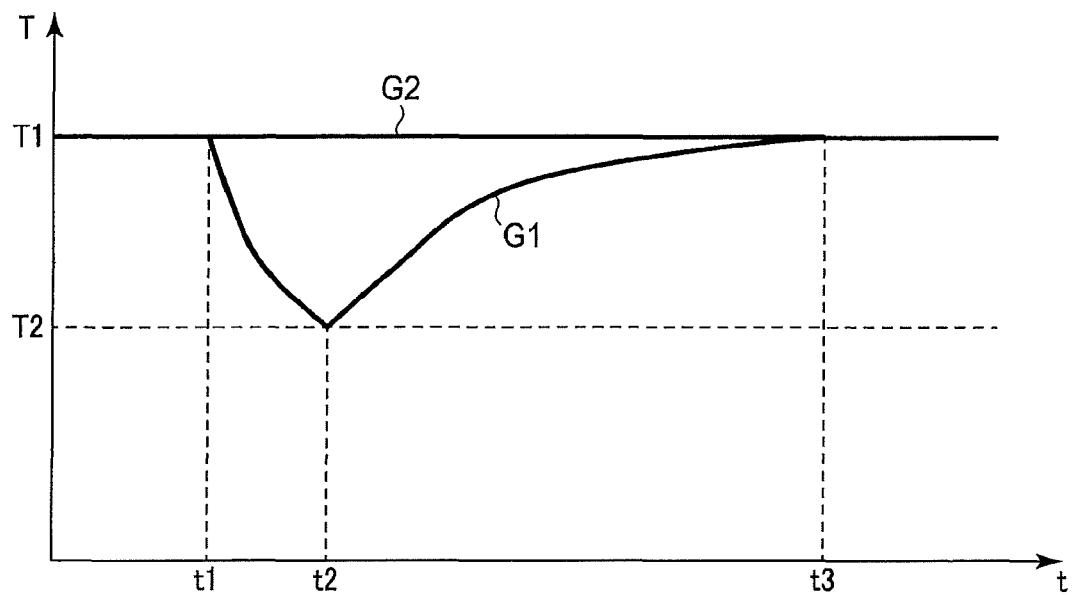
FIG. 6 is a diagram showing an interior temperature change in the sample dispensing probe and the sample dispensing unit shown in FIG. 4A.

Next, a temperature change in each of a conventional automatic analyzing apparatus and the automatic analyzing apparatus 1 according to the present embodiment when cleaning the inner wall of a sample dispensing probe will be explained. In the following explanation, suppose the temperature of the pressure transmitting medium filled in the tank 2078 from the exterior of the automatic analyzing apparatus 1 is lower than the temperature in the apparatus of the automatic analyzing apparatus 1. FIG. 6 is a diagram showing an interior temperature change in the sample dispensing probe 205 and the sample dispensing unit 207 shown in FIG. 4A. In FIG. 6, the graph G1 shows the interior temperature change in the sample dispensing probe 205 and the sample dispensing unit 207 when the thermal exchanger 2076 and the heat insulators according to the present embodiment are not used. The graph G2 shows an interior temperature change in the sample dispensing probe 205 and the sample dispensing unit 207 according to the present embodiment. In FIG. 6, the horizontal axis represents a time t, and the vertical axis represents an interior temperature T of the sample dispensing probe 205 and the sample dispensing unit 207.

In the graph G1 shown in FIG. 6, the temperature T before the cleaning operation starts is approximately the same as the temperature of the atmosphere in the apparatus, T=T1. Herein, when the cleaning operation starts, the pressure transmitting medium (e.g., pure water) flows into the inside of the sample dispensing probe 205 and the sample dispensing unit 207 shown in FIG. 2 from the tank 2078; as a result, the temperature T1 drops to T2 (<T1) from t1 to t2, as shown in FIG. 6. When the cleaning operation finishes thereafter at the time t2, the temperature T2 rises and returns to the original temperature T1.

In this case, the pressure transmitting medium filled in the members constituting the flow path in the sample dispensing probe 205 and the sample dispensing unit 207 and in the flow path expands between the time t2 and the time t3 as shown in FIG. 6 under the influence of the temperature rise. Thus, if a test sample is dispensed between the time t2 and t3, particularly immediately after the time t2 when the temperature gradient is steep, an error occurs in an amount of a dispensed test sample, and accuracy in dispensing is degraded.

Even if the temperature of the pressure transmitting medium that is supplied from the exterior of the automatic analyzing apparatus 1 to be filled in the tank 2078 is high, a period of a steep temperature gradient (i.e., a period in which the temperature sharply drops) occurs; as a result, dispensing a test sample during such a period causes an error in an amount of the dispensed test sample, and the accuracy in dispensing is degraded.

On the other hand, in the graph G2 shown in FIG. 6, the temperature T stays at approximately T1 before and after the cleaning operation by the sample dispensing probe 205 because of the heat exchange by the thermal exchanger 2076 of the automatic analyzing apparatus 1 according to the present embodiment, regardless of the temperature of the pressure transmitting medium supplied from the external of the automatic analyzing apparatus 1 to be filled in the tank 2078, and a period of time in which a temperature gradient (change rate) is steep does not appear. Thus, even when a cycle time is set short and a very small amount of a test sample needs to be dispensed immediately after the cleaning operation, in other words, even when an amount of a test sample used per dispensing is very small, it is possible to prevent losing accuracy in dispensing. A very small amount is for example 1 µl.

According to the above embodiment, the thermal exchanger 2076 is provided within the flow path up to the point where the pressure transmitting medium (liquid) supplied from the tank 2078 reaches the open/close valve 2074. The thermal exchanger 2076 performs heat exchange between the atmosphere in the apparatus of the automatic analyzing apparatus 1 and the pressure transmitting medium in at least a part of the flow path.

Thus, in the thermal exchanger 2076, the temperature of the pressure transmitting medium supplied to the tank 2078 becomes close to the temperature of the atmosphere in the apparatus. It is thereby possible to maintain a temperature uniformly in the inside and outside of the flow path where the pressure transmitting medium flows in the range from the distal end of the sample dispensing probe 205 to the open/close valve 2074. In other words, it is possible to prevent volume expansion or contraction of the pressure transmitting medium that flows in the members constituting the flow path and in the flow path in the range from the distal end of the sample dispensing probe 205 to the open/close valve 2074 before and after the cleaning of the inner wall of the sample dispensing probe 205. Accordingly, even when a test sample is dispensed immediately after the cleaning operation, no errors occur in an amount of the dispensed test sample.

Furthermore, the thermal exchanger 2076 can exchange heat without being controlled by the control circuitry 8. For this reason, an implementing cost and an operating cost can be reduced compared to a case where active temperature control is performed using a heater, etc. provided to heat a pressure transmitting medium. A simple structure, such as a stainless pipe, is sufficient for the thermal exchanger 2076; accordingly, a footprint of the thermal exchanger 2076 can be significantly reduced compared to a heater, etc. Since the thermal exchanger 2076 does not generate heat by itself, it is possible to suppress a temperature rise in the apparatus, compared to a heater, etc.

The thermal exchanger 2076, which exchanges heat between two materials, is capable of bringing the temperature of the pressure transmitting medium close to the temperature of the atmosphere in the apparatus even when the temperature of the pressure transmitting medium stored in the tank 2078 is higher or lower than the temperature of the atmosphere in the apparatus. In contrast, a heater is usable only when the temperature of the pressure transmitting medium stored in the tank 2078 is lower than the temperature of the atmosphere in the apparatus.

Since the thermal exchanger 2076 is provided between the tank 2078 and the open/close valve 2074, it is possible to limit a range which requires heat insulation to a flow path in from the outlet of the thermal exchanger 2076 to the distal end of the sample dispensing probe 205. In other words, it is necessary to cover the flow path from the tank 2078 to the thermal exchanger 2076 with a heat insulator. The cost for heat insulators can be thereby reduced.

It is thus possible to prevent losing accuracy in dispensing with a simple and inexpensive structure, compared to a conventional apparatus.

By using the thermal exchanger of each of the first reagent dispensing unit 213 and the second reagent dispensing unit 219, it is possible to prevent losing accuracy in dispensing of a reagent and to reduce an amount of reagent used per analysis at the same time. It is thereby possible to achieve reducing a cost for reagents.

It is most preferable to use a stainless-made pipe as the thermal exchanger 2076 in the present embodiment where pure water is used as a pressure transmitting medium. Since a passive-state coating is formed on the surface of the stainless pipe, it is possible to prevent a material constituting the pipe from dissolving into pure water. This is because a component dissolved into pure water may affect an analysis result if an object or a reagent is diluted, or a probe or a reaction tube is cleaned by the pure water into which a material constituting the pipe is dissolved.

Other Embodiments

The present invention is not limited to the foregoing embodiments. In the above embodiment, the thermal exchanger 2076 is explained using a stainless pipe as an example; however, the thermal exchanger 2076 is not limited thereto. For example, the thermal exchanger 2076 may be an aluminum pipe in which a passive-state coating is easily formed on its surface, or a copper pipe that has excellent heat conductivity. The thermal exchanger 2076 may be a structure with a function for increasing heat exchange efficiency, such as a stainless pipe having a fin for the purpose of increasing a heat transfer surface.

The thermal exchanger 2076 may be of any form or structure, as long as it is capable of heat exchanging between materials. The thermal exchanger 2076 may be a double-tube thermal exchanger, a plate-shaped thermal exchanger, a shell-and-tube thermal exchanger, a cross-fin thermal exchanger, or a compact thermal exchanger, for example.

Figure 7:
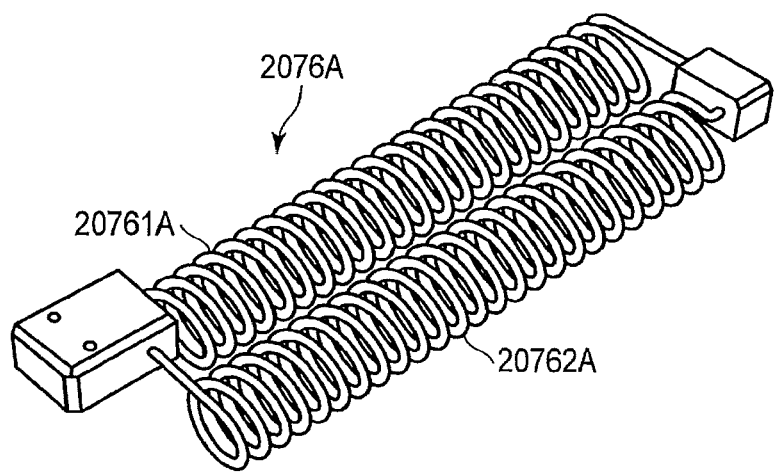
FIG. 7 is a diagram showing a configuration of a thermal exchanger according to another embodiment.

FIG. 7 is a block diagram showing an example of the configuration of a thermal exchanger 2076A according to another embodiment. The thermal exchanger 2076A may be made of a same material as that of the thermal exchanger 2076. According to FIG. 7, the thermal exchanger 2076A has helical tubes 20761A and 20762A. Each of the helical (helix) tube 20761A and the tube 20762A has a flow path of the same length. Each of the tube 20761A and the tube 20762A is connected to an input end that is connected to the liquid supply pump 2077 and an output end that is connected to a third tube 2075 as appropriate, and it is easy to arrange these tubes.

The thermal exchanger 2076A having helical tubes 20761A and 20762A may make a flow path longer than, for example, that of the thermal exchanger 2076 shown in FIG. 4B under the same dedicated volume in the apparatus. The thermal exchanger 2076A may expand a surface area for heat exchange between a pressure transmitting medium and an atmosphere by making the flow path long. The thermal exchanger 2076A may allow the pressure transmitting medium passing the thermal exchanger to stay for a longer time in the thermal exchanger by making the flow path long. For this reason, it is possible to bring the temperature of the pressure transmitting medium closer to the temperature of the atmosphere in the apparatus when the pressure transmitting medium passes through the thermal exchanger 2076A.

The diameter of each of the tube 20761A and the tube 20762A of the thermal exchanger 2076A is smaller than, for example, the diameter of each of the tube 20761 and the tube 20762 of the thermal exchanger 2076 as shown in FIG. 4B. Normally, if a flow amount from the liquid supply pump 2077 is the same, a larger diameter of a tube of the thermal exchanger tends to cause a space, e.g., bubbles, inside the tube where the pressure transmitting medium is supposed to be filled; as a result, an area of contact between the pressure transmitting medium and the pipe is reduced, and heat thermal efficiency may be degraded. According to the thermal exchanger 2076A of another embodiment, compared to the thermal exchanger 2076 shown in FIG. 4A, it is possible to tightly fill a pressure transmitting medium in the thermal exchanger if a flow amount from the liquid supply pump 2077 is the same. It is thereby possible to prevent bubbles from remaining in the thermal exchanger.

In the foregoing embodiment, at least a part of the constituent elements of the sample dispensing probe and the sample dispensing unit shown in FIG. 4A is covered by heat insulators, but the embodiment is not limited thereto. For example, at least a part of each of the constituent elements of the sample dispensing probe and the sample dispensing unit shown in FIG. 4A may be made of a heat insulator.

The term "processor" used in the above explanation means, for example, circuitry such as a CPU (Central Processing Unit), a GPU (Graphics Processing Unit), an ASIC (Application Specific Integrated Circuit), or a programmable logic device (for example, an SPLD (Simple Programmable Logic Device), a CPLD (Complex Programmable Logic Device), or an FPGA (Field Programmable Gate Array). The processor realizes its function by reading and executing the program stored in the storage circuitry. Each processor of the present embodiment is not limited to a case where each processor is configured as a single circuit; a plurality of independent circuits may be combined into one processor to realize the function of the processor. Furthermore, a plurality of constituent elements shown in FIG. 1 may be integrated into one processor to realize the function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the inventions.

The invention claimed is:

1. An automatic analyzing apparatus for analyzing a test sample comprising:
   a photometer that optically analyzes the test sample;
   a liquid tank that stores a first liquid;
   a first pump that pressurizes and sends the first liquid supplied from the liquid tank;
   a dispensing probe that uses the first liquid that is sent from the first pump as a pressure transmitting medium;
   a thermal exchanger that exchanges heat between an atmosphere in the automatic analyzing apparatus and the first liquid in at least a part of a first flow path connecting the first pump to the liquid tank;
   an open/close valve that is provided between the first pump and the liquid tank and controls a supply of the first liquid from the liquid tank to the first pump; and a second pump that is provided between the open/close valve and the liquid tank and supplies the first liquid from the liquid tank to the open/close valve, wherein the thermal exchanger is arranged in the first flow path between the liquid tank and the open/close valve.

2. The automatic analyzing apparatus according to claim 1, wherein at least a part of a second flow path connecting the dispensing probe to the first pump has a heat insulating structure.

3. The automatic analyzing apparatus according to claim 1, wherein at least a part of a flow path connecting the first pump to the open/close valve in the first flow path has a heat insulating structure.

4. The automatic analyzing apparatus according to claim 1, wherein at least a part of a flow path connecting the open/close valve to the thermal exchanger in the first flow path has a heat insulating structure.

5. The automatic analyzing apparatus according to claim 1, wherein the thermal exchanger is a part of the first flow path and is arranged in the vicinity of the open/close valve in the flow path connecting the open/close valve to the second pump.

6. The automatic analyzing apparatus according to claim 1, wherein the first liquid is supplied from an outside of the automatic analyzing apparatus and filled in the liquid tank.

7. The automatic analyzing apparatus according to claim 1, wherein the first liquid is pure water.

8. The automatic analyzing apparatus according to claim 1, wherein the thermal exchanger is a stainless pipe.

9. The automatic analyzing apparatus according to claim 1, wherein the thermal exchanger has a helical tube.

10. A liquid transfer system in an automatic analyzing apparatus comprising:

a liquid tank that stores a first liquid;

a first pump that pressurizes and sends the first liquid supplied from the liquid tank;

a dispensing probe that uses the first liquid that is sent from the first pump as a pressure transmitting medium;

a thermal exchanger that exchanges heat between an atmosphere in the automatic analyzing apparatus and the first liquid in at least a part of a first flow path connecting the first pump to the liquid tank;

an open/close valve that is provided between the first pump and the liquid tank and controls a supply of the first liquid from the liquid tank to the first pump; and a second pump that is provided between the open/close valve and the liquid tank and supplies the first liquid from the liquid tank to the open/close valve, wherein the thermal exchanger is arranged in the first flow path between the liquid tank and the open/close valve.

11. The system according to claim 10, wherein at least a part of a second flow path connecting the dispensing probe to the first pump has a heat insulating structure.

12. The system according to claim 10, wherein at least a part of a flow path connecting the first pump to the open/close valve in the first flow path has a heat insulating structure.

13. The system according to claim 10, wherein at least a part of a flow path connecting the open/close valve to the thermal exchanger in the first flow path has a heat insulating structure.

14. The system according to claim 10, wherein the thermal exchanger is a part of the first flow path and is arranged in the vicinity of the open/close valve in the flow path connecting the open/close valve to the second pump.

15. The system according to claim 10, wherein the first liquid is supplied from an outside of the automatic analyzing apparatus and filled in the liquid tank.

16. The system according to claim 10, wherein the first liquid is pure water.

17. The system according to claim 10, wherein the thermal exchanger is a stainless pipe.

18. The system according to claim 10, wherein the thermal exchanger has a helical tube.

* * * * *